(12) United States Patent
Rousseau et al.

(10) Patent No.: US 6,363,196 B1
(45) Date of Patent: Mar. 26, 2002

(54) SINGLE MODE DISPERSION-SHIFTED OPTICAL FIBER WITH EXTERNAL REFRACTIVE INDEX RING

(75) Inventors: Jean-Claude Rousseau, Chatou; Marianne Paillot, Saint Brice sous Foret, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/509,939

(22) PCT Filed: Aug. 13, 1999

(86) PCT No.: PCT/FR99/01984

§ 371 Date: Apr. 4, 2000

§ 102(e) Date: Apr. 4, 2000

(87) PCT Pub. No.: WO00/10042

PCT Pub. Date: Feb. 24, 2000

(30) Foreign Application Priority Data

Aug. 13, 1998 (FR) .............................. 98 10382

(51) Int. Cl.[7] .................................... G02B 6/02
(52) U.S. Cl. ....................... 385/127; 385/123
(58) Field of Search ................. 385/123, 124, 385/126, 127

(56) References Cited

U.S. PATENT DOCUMENTS 5,684,909 A * 11/1997 Liu .............................. 385/127
6,256,440 B1 * 7/2001 Kato et al. ................... 385/123

FOREIGN PATENT DOCUMENTS

| DE | 3842805 | 6/1990 |
|---|---|---|
| EP | 0 127 408 A1 | 12/1984 |
| EP | 0 341 427 A2 | 11/1989 |
| EP | 0 664 464 A1 | 7/1995 |
| EP | 0775924 A2 * | 5/1997 |
| EP | 0902307 | 3/1999 |
| GB | 2 116 744 | 9/1983 |
| JP | 59-232302 | 12/1984 |
| JP | 1-207705 | 8/1989 |
| JP | 2-23305 | 1/1990 |
| JP | 10-10350 | 1/1998 |
| JP | 10-186156 A * | 7/1998 |

OTHER PUBLICATIONS

A. Safaai–Jazi et al, "New Designs for Dispersion–Shifted and Dispersion Flattened Fibers" Proceedings of the SPIE, vol. 1176, Sep. 5, 1989, pp. 196–201.

* cited by examiner

Primary Examiner—Rodney Bovernick
Assistant Examiner—Michael J Stahl
(74) Attorney, Agent, or Firm—Sughrue Mion, PLLC

(57) ABSTRACT

The invention relates to a dispersion-shifted single-mode fiber having cladding of given refractive index ($n_s$) and a fiber core having an index profile that is in the shape of a trapezium, a triangle, or a rectangle, together with a first ring, the index profile of the fiber core having an outer, second ring of index ($n_3$) greater than the index of said cladding ($n_s$), said fiber being characterized in that the index ($n_3$) of said second ring is greater than or equal to the index ($n_2$) of said first ring. The invention provides better control over the wavelength at which chromatic dispersion is zero, while conserving the other transmission characteristics of known fibers, such as mode diameter and attenuation.

20 Claims, 1 Drawing Sheet

SINGLE MODE DISPERSION-SHIFTED OPTICAL FIBER WITH EXTERNAL REFRACTIVE INDEX RING

BACKGROUND OF THE INVENTION

The present invention relates to a dispersion-shifted single-mode optical fiber.

Single-mode optical fibers that are referred to as "dispersion-shifted fibers" (DSFs) are such that, at the transmission wavelength at which they are used (which wavelength is, in general, different from the wavelength of 1.3 μm for which the dispersion of silica is substantially zero), the chromatic dispersion of the transmitted wave is substantially zero; i.e. the non-zero chromatic dispersion of silica is compensated (hence, the use of the term "shifted") by increasing the index difference Δn between the core of the fiber and the optical cladding. This index difference makes it possible to shift the wavelength for which the chromatic dispersion is zero. It is obtained by inserting dopants into the fiber while it is being manufactured, e.g. by a modified chemical vapor deposition (MCVD) process that is known per se, and that is not described in any more detail herein. A typical value for the index difference between the cladding and the core of the fiber is $24 \times 10^{-3}$. The increase in refractive index in silica can be obtained by using germanium as the dopant. The terms "cladding" and "core" are known to the person skilled in the art; conventionally, the "cladding" is the portion that extends to a diameter of 125 μm. The core corresponds to the portion in which about 70% of the light energy propagates.

Such single-mode fibers must also preferably have characteristics that correspond to the requirements both of cable-makers and of system designers: firstly they must have small mode diameters, and good "cablability" (i.e. suitability for being included in a cable), involving bending capacity of the fiber and low attenuation; and secondly they must have mode diameters that are as large as possible, large effective areas, and suitable values for the zero-dispersion wavelength $\lambda_0$. When such fibers are used for wavelength-division multiplexed (WDM) transmission systems, the constraints are even more stringent.

It would be preferable to use a fiber having a $\lambda_0$ value that is greater than or equal to 1,565 nm, and advantageously that is greater than or equal to 1,585 nm, in order to avoid using a dispersion-compensating fiber (DCF), which suffers from the drawbacks of facilitating non-linear effects, of having high attenuation, and of being difficult to lay in a cable. Unfortunately, existing fibers having such $\lambda_0$ values have small effective areas or high attenuation around 1,550 nm.

Numerous index profiles have been proposed for such dispersion-shifted single-mode optical fibers. The index profile is generally described as a function of the appearance of the curve representing the refractive index as a function of the radius of the fiber. The index profile is thus said to be "stepped", "trapezium-shaped" or "triangular" for curves representing the variation of refractive index as a function of radius that are respectively stepped, trapezium-shaped, or triangular. Such curves generally represent the ideal or reference profile of the fiber, it being possible for the constraints involved in manufacturing the fiber to give rise to a profile that is significantly different.

Early dispersion-shifted optical fibers were of the index-step, triangle, Gaussian, or α power type. The characteristics of those fibers are no longer considered to be sufficient, in particular because of their small mode diameters and of their sensitivity to bending, even though those fibers have attenuation values lower than 0.20 dB/km at 1,550 nm. A new family of fibers has thus been developed: fibers whose index profiles are trapezium-and-ring-shaped.

French Patent FR-A-2 724 234 describes a dispersion-shifted single-mode optical fiber having an index profile that is trapezium-shaped, or, in the limit, that is triangular or rectangular, with a ring surrounding the trapezium. FIG. 1 shows the appearance of the reference profile proposed in that document. As is conventional, the x-axis in FIG. 1 gives the distance r to the center of the fiber, and the y-axis gives the refractive index, defined by its percentage difference relative to the index of the cladding of the fiber. References hereinafter to the refractive index are made as relative values to the index of the cladding, as is conventional.

That fiber has an effective area of greater than 70 μm², and attenuation of about 0.20 dB/km at 1,558 nm, chromatic dispersion of about 0.7 ps/nm.km, and a $\lambda_0$ wavelength of about 1,550 nm.

European Patent Applications EP-A-0 131 634 and EP-A-0 368 014 describe a fiber of the same type, with a rectangular core surrounded by a ring.

European Patent Application EP-A-0 724 171 describes a fiber having an index profile with an α profile, surrounded by a triangular ring, as shown in FIG. 2. That fiber has an effective area of 72 μm².

In addition, European Patent Application EP-A-0 127 408 describes a fiber having an index profile with a rectangular core surrounded by two rings, the index of the rectangle and the index of each of the rings either being the same, or else said indices being different. Such a fiber has a core index that is less than or equal to the index of each of the rings. It is not apparent that such fibers make it possible to form dispersion-shifted fibers of the kind desired. In addition, the article by A. Safaaai-Jazi et al., "New designs for dispersion-shifted and dispersion-flattened fibers", Proceedings of the SPIE, Vol. 1176.5, September 1989, pages 196–201, presents a fiber having an index profile having a rectangular core with two rings, the two rings having the same index, and the index of the core being greater than the index of the rings. Such a fiber has the characteristics of a fiber having flat dispersion. It is not apparent that such a fiber makes it possible to form dispersion-shifted fibers of the kind desired.

Those various known solutions do not make it possible to obtain a $\lambda_0$ wavelength value that is high or that can be chosen freely, while also conserving the characteristics suitable for good "cablability".

SUMMARY OF THE INVENTION

The invention proposes a solution that makes it possible to maintain an effective area $A_{ef}$ that is large, typically above 70 μm², thereby limiting non-linear effects. The fiber of the invention also makes it possible to obtain attenuation that is low, preferably less than or equal to 0.2 dB/km, and chromatic dispersion that is generally greater than or equal to 1.5 ps/nm.km in absolute terms, e.g. about 2 ps/nm.km in absolute terms, for wavelengths in the range 1,530 nm to 1,585 nm. In addition, it makes it possible, for all these parameters, to obtain a zero chromatic dispersion wavelength $\lambda_0$ that is advantageously greater than or equal to 1,585 nm; which makes it possible (if the fiber is used for WDM transmissions) to avoid or to limit four-wave mixing and the use of dispersion-compensating fibers.

In other words, the invention proposes a method of increasing the value $\lambda_0$ of the wavelength for which chromatic dispersion is zero in a dispersion-shifted single-mode optical fiber having cladding with a given index ($n_s$), a fiber core with an index profile that is trapezium-shaped, or in the limit that is triangular or rectangular, with a ring, and a mode diameter that is advantageously greater than or equal to 8 μm, including the addition in the index profile of the fiber core of an outer annular portion of index greater than the index of the cladding and greater than or equal to, and preferably greater than, the index of the ring of the core.

The invention thus provides a dispersion-shifted single-mode fiber having:

cladding of given refractive index;

a fiber core having an index profile that is in the shape of a trapezium, a triangle, or a rectangle, together with a first ring, the index profile of the fiber core having an outer, second ring of index greater than the index of said cladding;

said fiber being characterized in that the index of said second ring is greater than or equal to the index of said first ring.

Preferably, the index of said second ring generally lies in the range $1 \times 10^{-3}$ to $6 \times 10^{-3}$.

Preferably, the index of said second ring is greater than the index of said first ring.

Preferably, the second ring has a thickness lying in the range 0.3 times the radius of the trapezium, triangle, or rectangle portion of the core to 0.8 times said radius.

It is also possible to make provision for the index of said first ring to be greater than the index of the cladding.

In an embodiment, the maximum index of said trapezium, triangle, or rectangle is generally greater than or equal to $9 \times 10^{-3}$.

Preferably, the maximum index of said trapezium, triangle, or rectangle has a value at least 50% greater than the value of the index of said first ring.

In an embodiment, the index of said first ring generally lies in the range $1 \times 10^{-3}$ to $3 \times 10^{-3}$.

In an embodiment, the index of the fiber between said trapezium, triangle, or rectangle and said first ring is less than or equal to the index of the cladding. Such an index generally lies in the range $-0.1 \times 10^{-3}$ to $-0.5 \times 10^{-3}$.

In another embodiment, the index between said first ring and said outer, second ring is less than or equal to the index of the cladding. Such an index generally lies in the range $-0.1 \times 10^{-3}$ to $-0.5 \times 10^{-3}$.

Preferably, the portion between said first ring and said second ring has a thickness lying in the range 0.3 times the radius of the trapezium, triangle, or rectangle portion of the core to 0.8 times said radius.

Advantageously, the index between said first ring and said outer second ring is less than or equal to the index between said trapezium, triangle, or rectangle and said first ring.

It is also possible, between said outer second ring and the cladding, to provide an annular portion of index less than the index of said second ring and the index of the cladding. Such an index generally lies in the range $-0.1 \times 10^{-3}$ to $-0.5 \times 10^{-3}$.

The fiber of the invention is such that the value of the wavelength for which the chromatic dispersion is zero is advantageously greater than or equal to 1,565 nm, and preferably greater than or equal to 1,585 nm.

Advantageously, said fiber has an effective area greater than or equal to 70 μm².

Preferably, it has attenuation less than 0.2 dB/km for a wavelength value of 1,550 nm.

In an embodiment, the fiber has a cutoff wavelength of less than 1,530 nm. It may also have chromatic dispersion of about −2 ps/nm.km in the range 1,530 nm to 1,580 nm.

BRIEF DESCRIPTION OF THE DRAWINGS

Other characteristics and advantages of the invention appear on reading the following description of various embodiments of the invention, given by way of example and with reference to the accompanying drawings, in which.

DETAILED DESCRIPTION OF THE INVENTION

Figure 1:
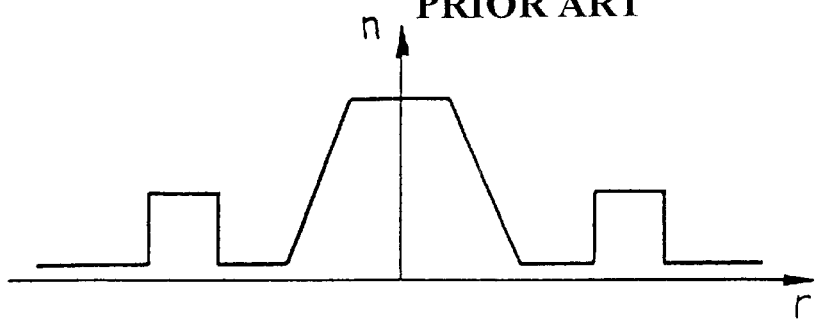
FIGS. 1 and 2 are diagrams showing the reference index profiles of known dispersion-shifted single-mode fibers.
Figure 2:
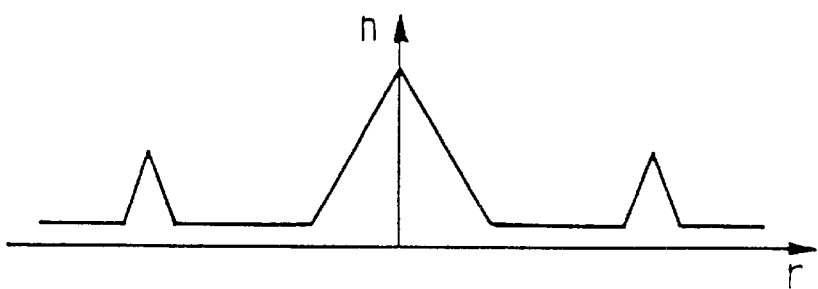

FIGS. 1 and 2 have already been discussed.

The invention proposes to add a second ring of index greater than or equal to, and preferably greater than, the index of a first ring to existing dispersion-shifted single-mode fiber profiles of the trapezium-and-ring type. It makes it possible to conserve low attenuation and large effective area, while also obtaining $\lambda_0$ values that are high, and typically greater than or equal to 1,565 nm, and advantageously greater than or equal to 1,585 nm.

The invention generally makes it possible to obtain a $\lambda_0$ wavelength of at least 1,565 nm, and preferably of at least 1,585 nm, together with the following characteristics:

effective area greater than or equal to 70 μm²;

attenuation less than or equal to 0.2 dB/km for a wavelength value of 1,550 nm;

a cutoff wavelength less than or equal to 1,530 nm; and chromatic dispersion of about −2 ps/nm.km from 1,530 nm to 1,580 nm.

It is also possible to provide an annular portion around the first ring, which portion has a refractive index that is less than that of the cladding, in particular if this makes it easier to manufacture the fiber.

Example 1 (by Way of Comparison)

By way of comparison, consideration is given below to a fiber having a profile of the type shown in FIG. 1, with a trapezium-shaped central portion, and a single ring: the fiber has a central portion of index $n_1 = +10.5 \times 10^{-3}$ for radii of less than $a_0$, a portion of index $n_4 = -0.3 \times 10^{-3}$ for radii from $a_1$ to $a_2$, the index decreasing substantially linearly from $a_0$ to $a_1$, a portion of index $n_2 = +2 \times 10^{-3}$ for radii from $a_2$ to $a_3$, and cladding.

The radii satisfy the following relationships:

$$a_0/a_1 \leq 0.4;$$

$$a_2/a_1 \geq 1.4;$$

and $$0.3 \leq (a_3 - a_2)/a_1 \leq 0.8.$$

Such a fiber has a $\lambda_0$ wavelength for which chromatic dispersion is zero of 1,565 nm, an effective area of 50 μm², ideal attenuation R=0.175 dB/km at 1,550 nm, and a cutoff wavelength of about 1,300 nm.

Example 2 (of the Invention)

Figure 3:
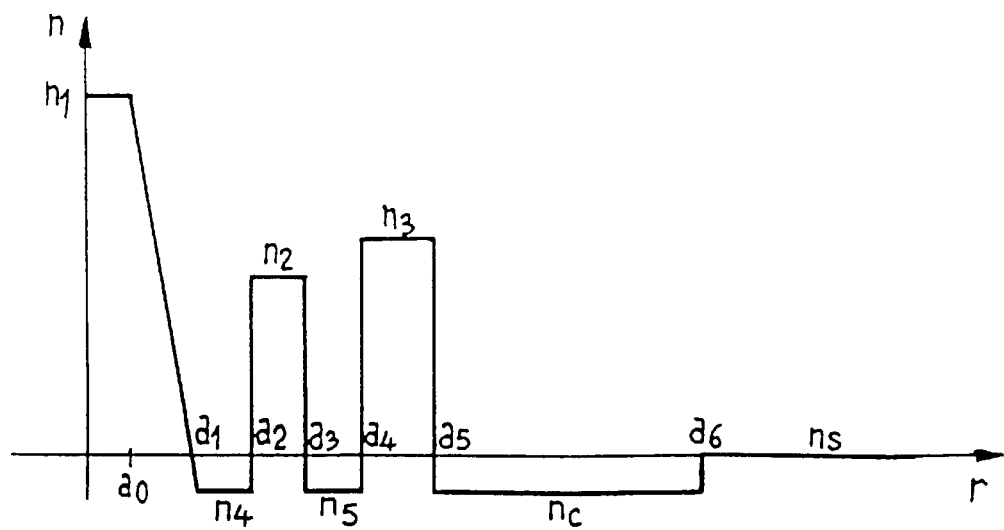
FIG. 3 is a diagram showing the index profile of a fiber of the invention.

FIG. 3 is a diagram showing the index profile of a first embodiment of a fiber of the invention; The fiber of FIG. 3 is fiber of the triangle-and-ring or trapezium-and-ring type, to which a second ring or "outer ring" of index greater than or equal to the index of the first ring is added. This fiber therefore has a trapezium-shaped central portion and two rings, i.e., more precisely:

a central portion of index $n_1 = +10.5 \times 10^{-3}$ for radii of less than $a_0$;

a portion of index $n_4 = -0.3 \times 10^{-3}$ for radii from $a_1$ to $a_2$, the index decreasing substantially linearly from $a_0$ to $a_1$;

a portion of index $n_2 = +2 \times 10^{-3}$ for radii from $a_2$ to $a_3$;

a portion of index $n_5 = -0.3 \times 10^{-3}$ for radii from $a_3$ to $a_4$;

a portion of index $n_3$, equal to index $n_2$, for radii from $a_4$ to $a_5$;

a portion of index $n_c = -0.3 \times 10^{-3}$ for radii from $a_5$ to $a_6$; and cladding of index $n_s$.

The radii also advantageously generally satisfy the following relationships:

$$2.5 \, \mu m \leq a_0 \leq 4 \, \mu m;$$

$$a_0/a_1 \leq 0.4;$$

$$a_2/a_1 \geq 1.4;$$

$$0.3 \leq (a_3-a_2)/a_1 \leq 0.8;$$

$$0.3 \leq (a_4-a_3)/a_1 \leq 0.8;$$

$$0.3 \leq (a_5-a_4)/a_1 \leq 0.8;$$

and $$a_6 \leq 10 \times a_1.$$

This configuration of the invention makes it possible to achieve a $\lambda_0$ wavelength of 1,585 nm, while conserving the other parameters already obtained in the fiber of example 1. As explained above, this value for the $\lambda_0$ wavelength makes it possible to avoid using dispersion-compensating fiber in WDM applications. Compared with the prior art example, the value $\lambda_0$ of the wavelength for which chromatic dispersion is zero is increased.

The presence of the portion of index $n_c$ depends on the method of manufacturing the fiber, and this portion may be omitted in certain embodiments of the invention.

Example 3 (of the Invention)

In another embodiment, the invention proposes a fiber having an index profile analogous to that of example 2 (cf FIG. 3), but with an index $n_3 = +4 \times 10^{-3}$, i.e. an index that is greater than the index $n_2$. In this example, the fiber has a value of 1,620 nm for the $\lambda_0$ wavelength. The cutoff wavelength is 1,530 nm, and the other parameters are identical to those of example 2.

Thus, in comparison with example 2, it has been shown that the transmission characteristics constituted by effective area and attenuation conserve advantageous values, while the presence of a second ring of index greater than that of the first ring advantageously makes it possible to obtain a higher value for the $\lambda_0$ wavelength.

Example 4 (of the Invention)

The profile of example 4 is identical to the profile of example 2, except that the index $n_1$ is $9 \times 10^{-3}$. It is then possible to obtain a $\lambda_0$ wavelength of 1,565 nm, an effective area of 70 $\mu m^2$, and attenuation of R=0.161 dB/km at 1,550 nm.

By reducing the value of the index $n_1$, the effective area is increased and the attenuation is decreased; the $\lambda_0$ wavelength is 1,565 nm. By way of comparison, an analogous fiber without the second ring would have a $\lambda_0$ wavelength of about 1,530 nm.

Example 5 (of the Invention)

The profile of example 5 is identical to the profile of example 3, except that the index $n_1$ is $9 \times 10^{-3}$. In which case, it is possible to obtain a $\lambda_0$ wavelength of 1,585 nm, an effective area of 80 $\mu m^2$, and attenuation of R=0.160 dB/km at 1,550 nm.

Thus, in comparison with example 4, it has been shown that the transmission characteristics of the fiber that are constituted by effective area and attenuation conserve advantageous values, while the presence of a second ring of index greater than that of the first ring advantageously makes it possible to obtain a higher value for the $\lambda_0$ wavelength.

In all these examples, similar results are obtained by modifying the values of the indices $n_4$, $n_5$, and $n_c$, which may be distinct or otherwise. These values may be greater than, less than, or equal to the value of the index $n_s$ of the cladding.

The invention thus makes it possible to increase the value of the wavelength for which dispersion is zero, in comparison with a known fiber profile.

Naturally, the present invention is not limited to the embodiments described and shown, but rather numerous variants are accessible to the person skilled in the art. It is thus possible to use a second ring which, instead of having a rectangular profile, as in the preferred embodiments described above, has a triangular or trapezium-shaped profile. Such a profile makes it possible for the value of the wavelength for which chromatic dispersion is zero to be further increased.

What is claimed is:

1. A dispersion-shifted single mode fiber having:
    cladding of given refractive index ($n_s$); and
    a fiber core having an index profile that is in the shape of a trapezium, a triangle, or a rectangle, together with a first ring, the index profile of the fiber core having an outer, second ring of index ($n_3$) greater than the index of said cladding ($n_s$), and greater than or equal to the index ($n_2$) of said first ring,
    wherein the zero chromatic dispersion wavelength $\lambda_0$ of said fiber is greater than or equal to 1585 nm, and
    wherein the chromatic dispersion is greater than or equal to 1.5 ps/nm.km in absolute term for wavelengths in the range 1530 nm to 1585 nm.

2. A fiber according to claim 1, such that the index ($n_3$) of said second ring is greater than the index ($n_2$) of said first ring.

3. A fiber according to claim 1, such that the index ($n_3$) of said second ring, relative to the index of the cladding, lies in the range $1 \times 10^{-3}$ to $6 \times 10^{-3}$.

4. A fiber according to claim 1, such that said second ring has a thickness ($a_5-a_4$) lying in the range 0.3 times the radius of the trapezium, triangle, or rectangle portion ($a_1$) of the core to 0.8 times said radius.

5. A fiber according to claim 1, such that the index ($n_2$) of said first ring is greater than the index ($n_s$) of the cladding.

6. A fiber according to claim 1, such that the maximum index ($n_1$) of said trapezium, triangle, or rectangle, relative to the index of the cladding, is greater than or equal to $9 \times 10^{-3}$.

7. A fiber according to claim 1, such that the maximum index ($n_1$) of said trapezium, triangle, or rectangle, relative to the index of the cladding, has a value at least 50% greater than the value of the index of said first ring ($n_2$), relative to the index of the cladding.

8. A fiber according to claim 1, such that the index ($n_2$) of said first ring, relative to the index of the cladding, lies in the range $1\times10^{-3}$ to $3\times10^{-3}$.

9. A fiber according to claim 1, such that the index ($n_4$) between said trapezium, triangle, or rectangle and said first ring is less than or equal to the index ($n_s$) of the cladding.

10. A fiber according to claim 1, such that the index ($n_4$) between said trapezium, triangle, or rectangle and said first ring, relative to the index of the cladding, lies in the range $-0.1\times10^{-3}$ to $-0.5\times10^{-3}$.

11. A fiber according to claim 1, such that the index ($n_5$) between said first ring and said outer, second ring is less than or equal to the index ($n_s$) of the cladding.

12. A fiber according to claim 1, such that the index ($n_5$) between said first ring and said outer ring, relative to the index of the cladding, lies in the range $-0.1\times10^{-3}$ to $-0.5\times10^{-3}$.

13. A fiber according to claim 1, such that the portion between said first ring and said second ring has a thickness ($a_4-a_3$) lying in the range 0.3 times the radius ($a_1$) of the trapezium, triangle, or rectangle portion of the core to 0.8 times said radius.

14. A fiber according to claim 1, such that the index ($n_5$) between said first ring and said outer second ring is less than or equal to the index ($n_4$) between said trapezium, triangle, or rectangle and said first ring.

15. A fiber according to claim 1, such that, between said outer second ring and the cladding, it has an annular portion of index ($n_c$) less than the index ($n_3$) of said second ring and the index ($n_s$) of the cladding.

16. A fiber according to claim 15, such that said index ($n_c$), relative to the index of the cladding, lies in the range $-0.1\times10^{-3}$ to $-0.5\times10^{-3}$.

17. A fiber according to claim 1, having an effective area greater than or equal to 70 $\mu$m$^2$.

18. A fiber according to claim 1, having attenuation less than 0.2 dB/km for a wavelength value of 1,550 nm.

19. A fiber according to claim 1, having a cutoff wavelength of less than 1,530 nm.

20. A fiber according to claim 1, having chromatic dispersion of about $-2$ ps/nm.km in the range 1,530 nm to 1,580 nm.

* * * * *